United States Patent [19]

Bruggeman et al.

[11] 4,376,066

[45] Mar. 8, 1983

[54] METHOD FOR PREPARING A CATALYST FOR AN ISOTOPIC EXCHANGE COLUMN

[75] Inventors: Aime E. Bruggeman, Retie; Roger F. R. Leysen, Mol; Philippe Vermeiren, Wemmel; Marcel Monsecour, Mol, all of Belgium

[73] Assignee: Studiecentrum voor Kernenergie, S.C.K., Brussels, Belgium

[21] Appl. No.: 285,483

[22] Filed: Jul. 21, 1981

[30] Foreign Application Priority Data

Jul. 31, 1980 [BE] Belgium .................... 884.563

[51] Int. Cl.$^3$ .................... B01J 31/02; B01D 5/02
[52] U.S. Cl. .................... 252/430; 423/580; 423/648 R
[58] Field of Search .................... 252/430

[56] References Cited

U.S. PATENT DOCUMENTS

| | | | |
|---|---|---|---|
| 2,540,599 | 2/1951 | Segura | 252/430 |
| 2,976,253 | 3/1961 | Edwards | 252/430 |
| 3,388,004 | 6/1968 | Rosenblatt . | |
| 3,419,900 | 12/1968 | Elmore et al. | 252/430 X |
| 3,888,974 | 6/1975 | Stevens | 252/430 |
| 3,981,976 | 9/1976 | Stevens | 423/580 |
| 4,110,425 | 8/1978 | Bühl et al. | 252/430 |
| 4,163,811 | 8/1979 | Kohlmayr et al. | 252/430 |
| 4,171,283 | 10/1979 | Nakashima et al. | 252/430 |
| 4,224,185 | 9/1980 | Wristers | 252/430 |

*Primary Examiner*—Arthur P. Demers
*Attorney, Agent, or Firm*—Stevens, Davis, Miller & Mosher

[57] ABSTRACT

Carrier particles whereon a metal from the group VIII of the periodic element system is fixed are dry-mixed with particles from hydrophobic material which is simultaneously a binder and may thus bind the carrier particles together. The thus obtained mixture is subjected to an agglomeration step. The resulting agglomerates are broken. The broken agglomerates are screened and that fraction with a grain size smaller than 1 mm is pressed into a cake at a pressure of 25 kg/cm$^2$ at the most. The press cake is rolled and catalyst particles are cut from the rolled cake. The catalyst particles are mixed with hydrophilic particles. The thus obtained mixture is used in an isotopic exchange column for separating tritium from aqueous effluents. In this column the effluents are lead in counter-current to gaseous hydrogen.

10 Claims, 1 Drawing Figure

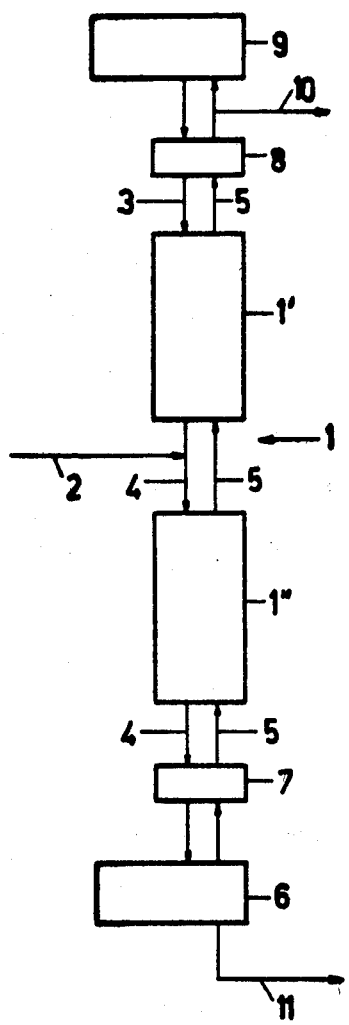

METHOD FOR PREPARING A CATALYST FOR AN ISOTOPIC EXCHANGE COLUMN

BACKGROUND

This invention relates to a method for preparing a catalyst for an isotopic exchange column, according to which to carrier particles whereon at least one metal from group VIII of the periodic element system is fixed, is added an hydrophobic organic material.

The catalyst prepared according to the above method is mainly intended to be used in an isotopic exchange column which is part of an equipment for separating tritium from aqueous effluents and in which the aqueous effluents are lead in counter-current to gaseous hydrogen.

A catalyst of such kind is known from U.S. Pat. No. 3,981,976. Said known catalyst is comprised of preferably porous carrier particles such as carbon, whereon a metal from group VIII of the periodic element system is fixed and which are thereafter coated with a hydrophobic covering, for example from polytetrafluorethylene, by dipping the metal-coated carried particles into or spraying same with a solution or suspension of the hydrophobic material, and thereafter vaporizing the liquid. Afterwards the particles are generally further sintered together by heating.

THE INVENTION

The invention provides a method wherewith a catalyst is prepared which results in obtaining a substantially increased tritium exchange rate inside the column.

According to the invention, the carrier particles metal is fixed on, are dry-mixed with particles from hydrophobic material which is simultaneously a binder and may thus bind the carrier particles together, the mixture of carrier particles provided with metal and particles from hydrophobic material is subjected to an agglomeration step, the resulting agglomerates are broken, the broken agglomerates are pressed into a cake, and catalyst particles are cut from said cake.

Preferably the broken agglomerates are pressed into a cake at a pressure of 25 kg/cm² at the most.

In an advantageous embodiment of the invention, the agglomeration step is performed inside a ball mill.

In a useful embodiment of the invention, the pressed cake is rolled before cutting particles therefrom.

The particles cut from the cake may also be mixed with hydrophilic particles.

The invention does not only pertain to the above-described method, but also to the catalyst prepared according to said method for an isotopic exchange column.

DESCRIPTION OF THE PREFERRED EMBODIMENT

Other features and advantages of the invention will stand out from the following description of a method for preparing a catalyst for an istopic exchange column and the thus-obtained catalyst; this description is only given by way of example and does not limit the invention; the reference numerals pertain to the accompanying drawing.

This FIGURE is a diagrammatic showing of a device for separating tritium from aqueous effluents which makes use of a catalyst according to the invention.

The preparation of the hydrophobic catalyst is mainly comprised of two series of operations: the operations from the first series coat the carrier particles with metal, and the operations from the second series convert the coated carrier particles together with hydrophobic material into catalyst particles which may be used inside an isotopic exchange column.

As material for the carrier particles are mostly considered active carbon, both with high and low specific area, graphite, $Al_2O_3$ and $SiO_2$.

As metals are particularly considered Fe, Co, Ni, Ru, Rh, Pd, Os, Ir, and Pt. Pt is mostly very suitable, either pure or together with Pd or Ni.

The coating of the carrier particles with a metal, that is the above-defined first operation series, is known per se.

On the carrier particles is preferably fixed an amount of metal which lies between 0.5 and 10 weight % as reckoned on the total amount of carrier particles and metal. Carrier particles comprised of active carbon with 5% platinum fixed thereon are particularly suitable for applying the invention.

As hydrophobic binder polytetrafluorethylene is mostly suitable. The polytetrafluorethylene sold by Du Pont under trade-mark "Teflon 6 N" or "Teflon 10 N" is particularly suitable. As reckoned on the total weight of the carrier particles with metal and the hydrophobic material, use is made of at least 15 weight % and at the most 96 weight % hydrophobic material. This amount lies preferably between 40 and 80% and very good results are obtained with at least 60% hydrophobic material.

The metal-coated carrier particles and the hydrophobic organic binder are dry-mixed in any powder mixer. The mixer is for example comprised of a ball mill. The mixture obtained due to the mixing operation is thereafter subjected to an agglomeration step. Said agglomeration step may also be performed inside a ball mill which rotates therefor at high speed. Due to the agglomeration step, there are formed agglomerates in the form of flakes or films with a surface area of a few square centimeters up to a few hundred square centimeters. Said agglomerates are strong enough mechanically to be handled.

Said agglomerates are broken inside a crusher. The broken agglomerates are pressed into a pressed cake whereby it is essential that the press pressure remains low and does not exceed 25 kg/cm².

From said pressed cake are cut catalyst particles, particularly by punching. The pressed cake may previously be rolled, for example down to half the thickness of the original cake. When the press cake is rolled, use is preferably made of succeeding rolling steps along directions at 90° to one another. The particles which are cut from the press cake are for example in the shape of small cylinders with a diameter in the range from 1.9 to 3 mm and a height in the range of 2 mm.

Preferably to the thus-obtained hydrophobic catalyst particles, are added hydrophile particles, for instance with a ratio of 2 hydrophile particles to 1 hydrophobic catalyst particle.

Said hydrophile particles have a size in the range of the size of the hydrophobic catalyst particles. For example a size in the range of 2 mm. Said particles may notably by comprised of glass beads, small stainless metal springs, and small stainless wire nettings, possibly etched.

The following example pertains to the preparation of a hydrophobic catalyst comprised of 60% active carbon, whereon 5% platinum is fixed, and 40% polytetrafluorethylene.

First series of operations to prepare active carbon whereon 5% platinum is fixed This preparation is comprised of the following steps:

a.
To 100 g active carbon is added water until all of the carbon is wet.
Thereafter 400 ml CH₃OH are added.
The whole is mixed during 15 minutes.
b. 5 g platinum in the form of 12.5 g H₂PtCl₆xH₂O are mixed with 400 ml CH₃OH during 5 minutes.
c.
The suspension obtained supra a. of active coal is mixed with the solution obtained by operation b. of chloroplatinum acid.
The whole mixture is left to vaporize under lower pressure at 60° C., for example in a so-called "Rotavapor" apparatus.
d. The black powder left-over after vaporizing is dried in a drying stove at 80° C. during at least 12 hours.
e.
The adsorbed platinum is then reduced under a hydrogen atmosphere at a temperature of 350° C. during 2 hours.
The heating and cooling of the oven occurs in an inert argon atmosphere.

Second series of operations to prepare the hydrophobic catalyst a. Polytetrafluorethylene from Du Pont, "Teflon 10 N", is screened with a mesh opening of 600 μm size. The usable fraction is that portion with a grain size smaller than 600 μm.
b. 40 g from said polytetrafluorethylene are mixed with 60 g from the platinum-plated carbon resulting from the first operation series.
The mixing operation is performed in a ball mill.
c. The mixture is subjected to an agglomerate forming in a ball mill which comprises for example four balls with 30 mm cross-section, and the revolution speed of the mill vessel is chosen as high as possible. The duration of the operation is 60 minutes.
d.
The agglomerates are broken.
At the laboratory level, this may occur by means of a coffee grinder. The fraction with a grain size smaller than 1 mm is further treated.
e. The mixture of broken agglomerates is pressed with a press pressure of less than 25 kg/cm² until a square press cake of 14×14 cm is obtained with a thickness of about 4 mm.
f.
The press cake is rolled, whereby the thickness decrease of the cake occurs by steps of 0.2 mm down to a thickness of about 2 mm.
The rolled cake with a decreasing thickness is always rotated over 90° during the rolling operations.
g. The catalyst particles are punched with the desired shape from the resulting catalyst sheet.
h. Said catalyst particles are mixed with hydrophilic filler material, for example with etched wire nettings from stainless metal.
The thus-obtained mixture of hydrophobic catalyst particles and hydrophilic particles may be used in an isotopic exchange column which is part of an equipment for separating tritium from aqueous effluents. With said equipment may be applied the following method.

The tritium-contaminated effluents are subjected in the first place to a monothermic catalytic isotope exchange inside an exchange column 1.

These contaminated effluents are for example originating from a reprocessing equipment for reprocessing the fuel from a nuclear reactor. As the tritium has to remain stored for rather a long time, it is naturally of importance to concentrate as far as possible this tritium into as small as possible an amount of effluent.

For this purpose these effluents are fed through the supply line 2 into the exchange column 1, and actually in a location where the tritium concentration of the reflux water is substantially equal to the tritium concentration in the effluents. Thereby the exchange column 1 is shown diagrammatically in two parts in the FIGURE, namely the "stripping" part 1' which is located above the supply line 2 and wherein thus the reflux water flows downwards and the enriching part 1'' which is located below the supply line 2 and wherein thus the reflux water flows downwards together with the added contaminated effluents. In the FIGURE, the reflux water flow is shown by the arrow 3, while the flow of the reflux water and tritium-containing aqueous effluents is shown by the arrow 4 in the figure.

Both in the stripping part 1' and in the enriching part 1'', gaseous hydrogen flows in counter-current with the falling reflux water or mixture of reflux water and added effluents. The hydrogen stream is shown by the arrows 5 in the FIGURE. During this counter-flowing of liquid water and gaseous hydrogen, there occurs a catalytic isotopic exchange whereby the downward-flowing water is enriched with tritium and the rising hydrogen becomes always poorer in tritium.

Inside the exchange column occurs the reaction:

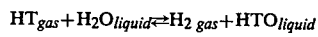

$$HT_{gas} + H_2O_{liquid} \rightleftarrows H_{2\,gas} + HTO_{liquid}$$

The equilibrium constant of this reaction is about 7.16 at 20° C. but decreases with the increase of the temperature. The isotopic exchange is consequently performed at low temperatures.

To obtain a high enough exchange rate, the column is filled with the above-described particles.

At the bottom of exchange column 1 is collected the tritium-enriched water which flows down due to gravity in an electrolysis apparatus 6.

Inside the electrolysis apparatus 6 substantially the complete stream of reflux water and tritium-contaminated effluents which has been enriched in-between with tritium, is converted into gaseous hydrogen. The resulting hydrogen, after a pre-treatment, namely part-condensing of the water vapour inside an air-cooled condenser 7 and a de-mister for retaining the electrolyte droplets carried along, is used for the above-mentioned gas stream which flows upwards through the exchange column.

After being treated in 8, a portion of the tritium-poor hydrogen is fed to the re-oxidizing device 9 while the remainder is discharged. Such discharge is shown diagrammatically in the FIGURE by arrow 10.

This re-oxidizing device 9 comprises a catalytic reactor wherein the hydrogen which has first been diluted with dry air and pre-heated, is burned to form water.

The electrolysis inside the electrolysis apparatus 6 increases itself the isotopic separation of tritium, as the electrolytically-produced hydrogen contains less tritium than the aqueous solution it does originate from.

From the electrolysis apparatus 6, part of the enriched water is discharged, such discharge being shown in the FIGURE by reference numeral 11.

This is for example part of the water vapour condensed out of the oxygen- or hydrogen-stream.

As considered approximately, the matter is that from the amount of tritium-containing aqueous effluents fed through line 2, 99.1% are discharged through 10 in the form of gaseous hydrogen, the tritium content of which is but 1/10 the content in the aqueous effluents and 0.9% are discharged through 11 at the bottom of the device in the form of enriched water, the tritium concentration of which is about one hundred times the tritium concentration in the supplied effluents.

The properties of the catalysts prepared according to the invention result notably from the following tests.

A series of tests has been performed on catalysts wherein no hydrophilic particles had been added. They show the activity of the catalysts in the presence of liquid water.

The activity of prepared hydrophobic catalysts in the presence of liquid water was tested by bubbling of hydrogen, at atmospheric pressure, through a batch of catalyst immersed in water with a known tritium content and by measuring the tritium activity of the dried hydrogen after exchange at different hydrogen flow rates, corresponding to linear velocities of 0.62 to 3.7 cm s$^{-1}$.

The activity of a catalyst at a specified temperature and hydrogen flow rate was expressed by the degree of exchange $\eta$, a number between 0 and 1, which, for the small concentrations of HT and HTO involved, is given by:

$$\eta = \frac{y_{out}}{y_e} = \frac{Ky_{out}}{x}$$

where
x: mole fraction of HTO in the water ($x \ll 1$)
$y_e$: mole fraction of HT in hydrogen in equilibrium with water containing a mole fraction x of HTO
$y_{out}$: mole fraction of HT in the hydrogen after leaving the column
K: equilibrium constant of the exchange reaction.

The most active catalyst was the one that yielded in otherwise constant conditions the highest reaction rate or the highest value for $\eta$.

Column diameter (inner): 14.4 mm
Catalyst filled column height: 50 mm
Hydrogen flow rate (20° C., $10^5$ Pa): 6 cm$^3$ s$^{-1}$
Catalyst shape and dimensions: cylindrical, $\phi = 3$ mm, h = 2 mm

| Catalyst composition (balance C) | | | | Degree of exchange $\eta$ at | | | | |
|---|---|---|---|---|---|---|---|---|
| PTFE | Pt | Remarks | Catalyst weight | 1° C. | 20° C. | 40° C. | 60° C. | 80° C. |
| 40 wt % | 0.3 wt % | | 2.60 g | 0.28 | 0.33 | 0.33 | 0.30 | 0.22 |
| 40 wt % | 0.6 wt % | | 3.00 g | 0.82 | 0.81 | 0.87 | 0.87 | 0.81 |
| 40 wt % | 1.5 wt % | | 4.19 g | — | 0.79 | 0.83 | — | 0.83 |
| 40 wt % | 1.8 wt % | a | 3.66 g | 0.70 | 0.92 | 0.95 | 0.96 | 0.94 |
| 60 wt % | 0.1 wt % | | 4.03 g | 0.31 | 0.37 | 0.49 | 0.46 | 0.45 |
| 60 wt % | 0.2 wt % | | 4.55 g | 0.48 | 0.63 | 0.73 | 0.72 | 0.64 |
| 60 wt % | 0.2 wt % | | 3.00 g (4cm) | 0.50 | 0.58 | 0.77 | 0.80 | 0.71 |
| 60 wt % | 0.4 wt % | | 3.77 g (4.6cm) | 0.67 | 0.81 | 0.84 | 0.85 | 0.79 |
| 60 wt % | 0.5 wt % | | 4.66 g | 0.79 | 0.91 | 0.95 | 0.98 | 0.97 |
| 80 wt % | 0.1 wt % | | — | | 0.39 | 0.58 | 0.62 | 0.77 | 0.77 |
| 80 wt % | 0.2 wt % | | — | 0.62 | 0.71 | 0.76 | 0.82 | 0.86 |
| 80 wt % | 0.2 wt % | | 5.36 g | 0.41 | 0.70 | 0.82 | 0.82 | 0.81 |
| 80 wt % | 0.5 wt % | | 5.92 g | — | 0.94 | 0.98 | 0.98 | 0.99 |
| 80 wt % | 1.0 wt % | | 5.8 g | | 0.98 | | 1.00 | |
| 92 wt % | 0.2 wt % | | 7.98 g | 0.22 | 0.41 | 0.45 | 0.56 | 0.51 |

Remark
a Shape and dimensions of this catalyst: cylindrical, $\phi = 1.9$ mm, h = 2 mm The hereinbelow-described test shows the working of the catalyst mixed with hydrophilic particles, inside a counter-current packed bed reactor.

The test is made at atmospheric pressure and a temperature of 40° C. inside a column with an inner diameter of 19.4 mm, which was filled over a height of 74.5 cm with a mixture of 34 volume % catalyst and 66 volume % filler material from etched stainless metal. The catalyst was comprised of small cylinders with a height of 2 mm and a diameter of 1.9 mm which were comprised for 80 weight % of polytetrafluorethylene and for the remainder of active carbon whereon 5 weight % platinum were present. The filler material was comprised of substantially similar-shaped but hollow cylinders, formed by spiral-like wound etched wire from stainless metal.

The test is made with a downwards water flow rate of 5.6 moles.h$^{-1}$, free from tritium at the input, and an upwards hydrogen flow rate of 14.0 moles.h$^{-1}$.

The mole fraction from HT in the input hydrogen was about $7.10^{-9}$, which corresponds to $7.10^6 B_q$ (0.2 mCi) tritium per mole. In the output hydrogen, the mole fraction from HT was but $2.1 \cdot 10^{-10}$, while the mole fraction from HTO in the output water reached $1.7 \cdot 10^{-8}$.

Neglecting the presence of water vapour and considering a small height of catalyst packing dZ (m) where the mol fraction of HT in the gaseous hydrogen is y and the mol fraction of HTO in the liquid water is x, the tritium exchange rate per unit column area could be written as $$G'dy = k(y - y_e)dZ$$

where
G': gas (hydrogen) flow rate per unit column area (moles s$^{-1}$m$^{-2}$)
k: overall exchange rate constant (moles s$^{-1}$m$^{-3}$)
$y_e = x/K$, with K the equilibrium constant of the tritium exchange reaction.

This gives a value of 90 moles $s^{-1}m^{-3}$ for the total exchange speed constant.

An otherwise identical test but at 60° C. gave as result 128 moles $s^{-1}m^{-3}$.

We claim:

1. A method for preparing a hydrophobic catalyst for an isotopic exchange column comprising the steps of dry-mixing 4 to 85 w % carrier particles on which 0.5 to 10 w % metal from group VIII of the periodic element system is fixed with 15 to 96 w % particles from hydrophobic material which is
   simultaneously a binder and may thus bind the carrier particles together,
   subjecting the thus obtained mixture to an agglomeration step, breaking the agglomerates,
   pressing the broken agglomerates into a cake, and
   cutting catalyst particles from said cake.

2. A method for preparing a hydrophobic catalyst for an isotopic exchange column comprising the steps of dry-mixing 4 to 85 w % carrier particles on which 0.5 to 10 w % metal from group VIII of the periodic element system is fixed with 15 to 96 w % particles from hydrophobic material which is
   simultaneously a binder and may thus bind the carrier particles together,
   subjecting the thus obtained mixture to an agglomeration step,
   breaking the agglomerates,
   screening the broken agglomerates and maintaining as the usable fraction that portion with a grain size smaller than 1 mm,
   pressing that usable fraction into a cake, and
   cutting catalyst particles from said cake.

3. The method of claim 1, in which the broken agglomerates are pressed into a cake at a pressure of 25 kg/cm² at the most.

4. The method of claim 1, in which the press cake is rolled after the pressing and before the cutting.

5. The method of claim 1, in which the press cake is rolled to half the thickness thereof.

6. The method of claim 1, in which after the pressing and before the cutting the press cake is subjected to succeeding rolling steps along directions at 90° to one another.

7. The method of claim 1, in which after the pressing and before the cutting the press cake is subjected to succeeding rolling steps which each cause a thickness reduction in the range of 0.2 mm.

8. The method of claim 1, in which the catalyst particles are mixed with hydrophilic particles.

9. The method of claim 8, in which hydrophilic particles are added to the catalyst particles with an amount ratio of 2 to 1.

10. The method of claim 9, in which the hydrophilic particles are chosen among the following elements: glass beads, small springs from stainless metal and small nettings from stainless metal.

* * * * *